United States Patent [19]
Gibson

[11] 3,856,166
[45] Dec. 24, 1974

[54] HAND TRUCK

[76] Inventor: Louis J. Gibson, 1014 Anna Rd., Huntingdon Valley, Pa. 19006

[22] Filed: Jan. 26, 1973

[21] Appl. No.: 326,972

[52] U.S. Cl.............. 214/370, 280/206, 280/47.26
[51] Int. Cl............................................. B62b 1/09
[58] Field of Search .......... 214/370, 380, 381, 382, 214/383, 384, 390; 280/47.3, 47.31, 78, 206, 207, 208, 47.26; 180/10, 20, 115

[56] References Cited
UNITED STATES PATENTS

| | | | |
|---|---|---|---|
| 2,001,205 | 5/1935 | Marten | 280/206 X |
| 3,301,358 | 1/1967 | Rubens | 280/47.31 X |
| 3,338,593 | 8/1967 | Gehring | 280/206 |
| 3,575,443 | 4/1971 | Aguilar | 280/206 |

Primary Examiner—Albert J. Makay
Attorney, Agent, or Firm—Smith, Harding, Earley & Follmer

[57] ABSTRACT

A hand truck comprising a hoop-like outer wheel of substantial diameter having a hoop-like rim mounted concentrically therein for relative movement therebetween. The inner rim is adapted to receive and support articles which are to be hand transported by the truck in a hoop-like fashion. There may be provided a platform or a fork member supported on the rim members for use in picking up, carrying and discharging the articles transported by the truck.

10 Claims, 13 Drawing Figures

HAND TRUCK

BACKGROUND OF THE INVENTION

This invention relates to hand trucks for transporting large articles, such as large household appliances or the like.

The hand trucks or other transport means in use today have several inadequacies in the transporting of large articles, such as in delivering refrigerators, freezers, stoves, washers, and other household appliances or the like, from the delivery van into the home of the customer. For example, these means generally require two or more men to operate, cannot operate satisfactory on unfavorable terrain and in unfavorable weather conditions, and often involve unsafe handling conditions with regard to personal injuries and property damage.

SUMMARY OF THE INVENTION

It is the general object of the invention to provide a hand truck capable of transporting large articles in an expeditious, safe, inexpensive way over unfavorable terrain and in unfavorable weather conditions. Briefly stated, the hand truck in accordance with the invention comprises an outer wheel means having a hoop-like configuration of a substantial diameter and an inner rim means of a hoop-like configuration mounted concentrically within the wheel means and having a circular rim portion on the interior of the wheel means. There are provided suitable bearing means between the wheel means and the rim means to permit relative movement therebetween so that the truck may be moved by hand as a hoop with the wheel means rotating about the rim means and an article to be transported supported in a desired attitude by the rim means.

If desired, there may be provided a platform supported on the inner rim means for use in picking up, supporting and discharging articles that are to be transported. For the same purpose, there may also be provided a fork means mounted on the inner rim means.

By reason of the hoop-like construction in acccordance with the invention there is provided a hand truck which can pick up, carry and deliver large articles more safely and more expeditiously than the prior art devices. Moreover, the hoop-like hand truck in accordance with the invention permits operation by one man and can be operated over unfavorable terrain and in unfavorable weather conditions. The hand truck is particularly adapted for receiving articles from the tailgate of a truck for delivery to a customer's residence and involves a safer handling to prevent personal injury and property damage.

DESCRIPTION OF THE PREFERRED EMBODIMENTS

Figure 1:
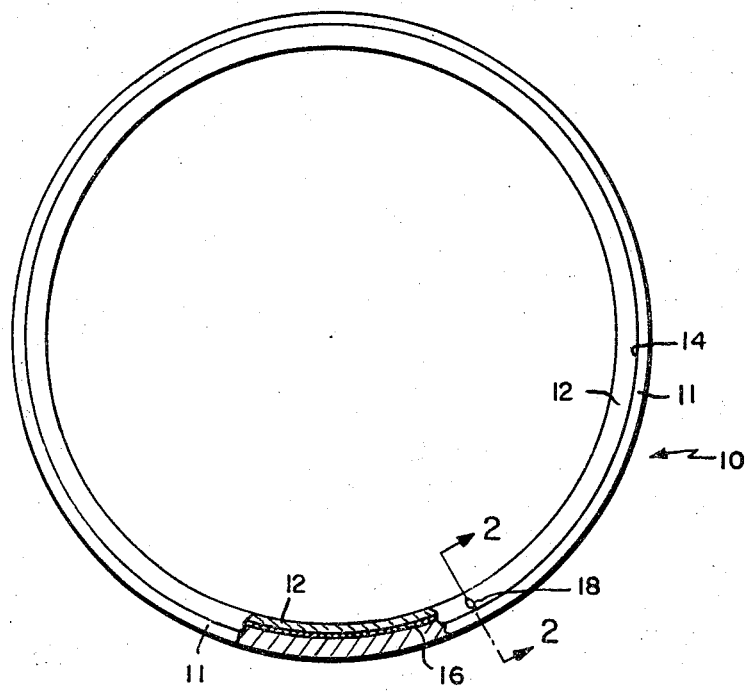
FIG. 1 is a side view of a hoop means in accordance with the invention.
Figure 2:
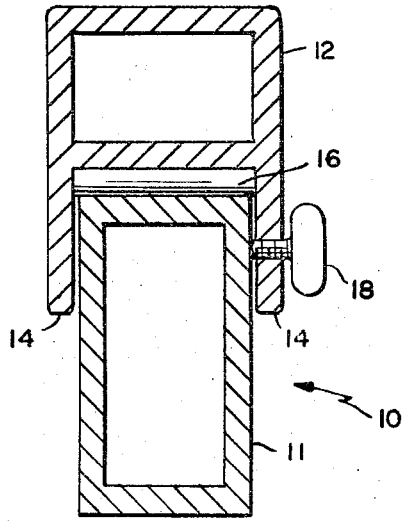
FIG. 2 is a sectional view taken on line 2 — 2 of FIG. 1.

The basic design of a hoop means 10 employed in the hand truck of the invention is shown in FIGS. 1 and 2 and comprises an outer wheel 11 of a hoop-like configuration and being about 4 to 5 feet in diameter and about two inches wide. Outer wheel 11 has a generally rectangular cross-section as is shown in FIG. 2. Mounted concentrically within outer wheel 11 is an inner rim 12 of a hoop-like configuration and a generally rectangular cross-section. Inner rim 12 has radially outwardly extending wall portions 14 adapted to receive the inner portion of the outer wheel 11 as is shown in FIG. 2.

There is provided bearing means in the form of roller bearings 16 located between outer wheel 11 and inner rim 12 to permit relative rotating movement therebetween. It will be evident that various other suitable bearing means may be provided.

There is also provided means for interconnecting the outer wheel 11 and the inner rim 12 for conjoint movement for a purpose to be described hereafter. Such means comprises a set screw 18 threadedly mounted in a wall portion 14 of inner rim 12 and arranged to frictionally engage the outer wheel 11 as is shown in FIG. 2. The head of set screw 18 has an enlarged wing shape so that it can be turned readily by hand. In order to interconnect outer wheel 11 and inner rim 12 the set screw 18 is turned by hand in the direction to cause the end thereof to engage the outer wheel 11.

Figure 3:
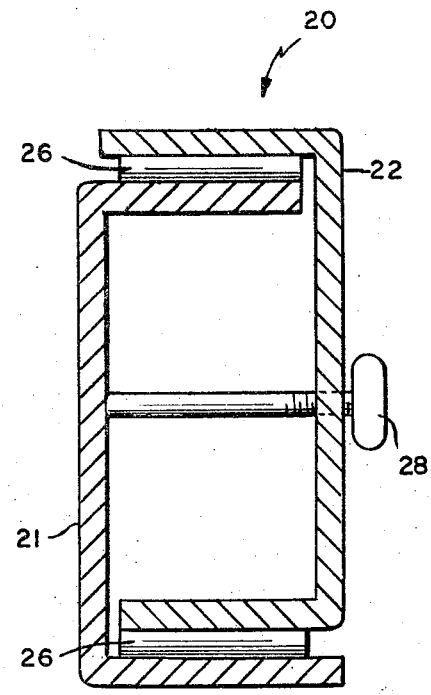
FIG. 3 is a sectional view of an alternate design in accordance with the invention.

An alternate design of the outer wheel and inner rim for the hoop means 20 is shown in FIG. 3. In this form both the outer wheel 21 and the inner rim 22 have a cross-section in the form of a U-shaped channel. The parts are constructed and arranged so that the inner rim fits concentrically within the outer wheel as shown in FIG. 3 with roller bearings 26 positioned between the opposed circular wall portions. A set screw 28 is provided for interconnecting the outer wheel 21 and the inner rim 22. Set screw 28 is threadedly mounted in inner rim 22 and is adapted to be rotated to place its end in frictional engagement with a portion of outer wheel 21 as shown in FIG. 3.

Figure 4:
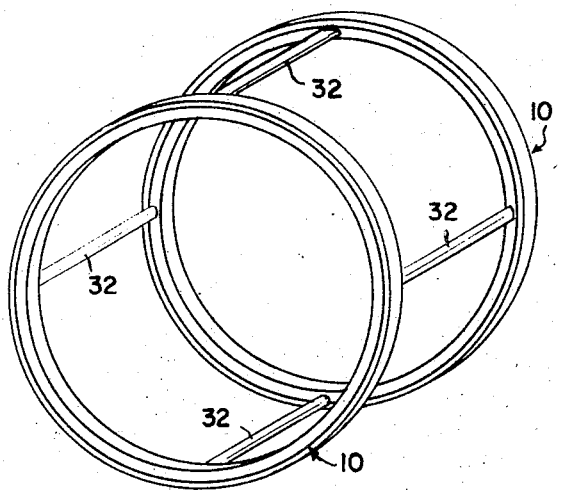
FIG. 4 is a perspective view of an alternate form of the invention.
Figure 5:
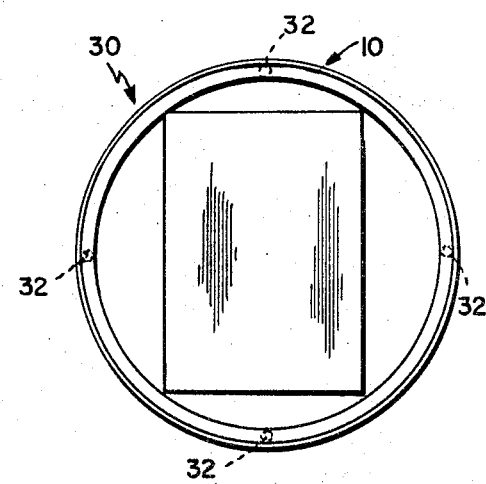
FIG. 5 is an elevational view of the embodiment shown in FIG. 4 shown supporting an article to be transported.

In FIG. 4 there is shown a hand truck 30 in accordance with the invention in which a pair of the hoop means 10 shown in FIG. 1 are joined together in spaced relation by a plurality of cross bars 32 which are secured to and extend between the inner rims of each of the hoop means 10. The hoop means 10 are spaced apart about 12 inches to provide for good balance for the hand truck. This form of the invention is designed to support the article to be transported on the interior of the inner rims of the hoop means 10 as shown in FIG.

5, these inner rims being designed structurally to withstand the loads involved. The articles are transported in hoop fashion with the outer wheels rotating about the inner rims which are held in position to support the article in the desired attitude.

Figure 6:
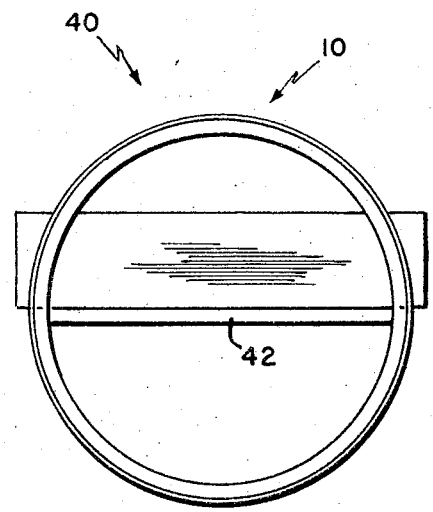
FIG. 6 is an elevation of another embodiment of the invention.
Figure 7:
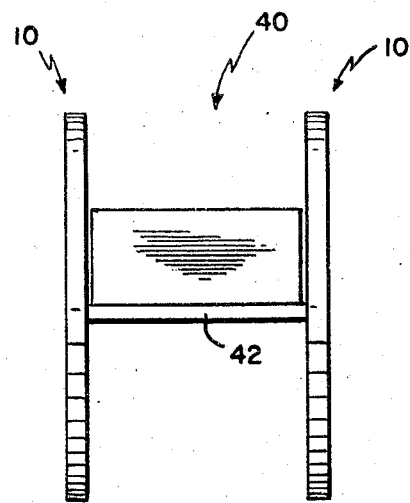
FIG. 7 is an end view of FIG. 6.

In FIGS. 6 and 7 there is shown a hand truck 40 in accordance with the invention in which a pair of the hoop means 10 are spaced apart and support a platform 42. The platform 42 is secured at its corners to the inner rim means of each of the wheel means 10. It will be apparent that in this form of the invention the article to be transported will be carried on the platform 42 and between the wheel means 10 as is shown in FIGS. 6 and 7.

This form of the invention has a particular application for use with delivering articles from the tailgate of a delivery truck and transporting it to the desired location such as the home of a customer. The hand truck shown in FIGS. 6 and 7 is also usable with articles located on the floor level. In this case, the hand truck is moved up to the article and the rim means are rotated to place the platform against the vertical side of the article. The set screw means of each of the hoop means 10 are then operated to engage the outer wheel and the inner rim together for conjoint movement. The article is then tilted backwardly onto the platform which is also rotated backwardly therewith to position the article onto the platform. The set screw means are then retracted to disengage the outer wheel and the inner rim and permit the inner rim to rotate relative to the outer wheel. The article is then transported in a hoop-like fashion and delivered onto the floor by the same general procedure as the picking up operation described heretofore. The article can be strapped to the platform 42 during the picking up and discharge operation if this seems desirable because of the weight of the article. Moreover, the outer wheel and the inner rim can be held together by hand if this is practical.

Figures 8, 9:
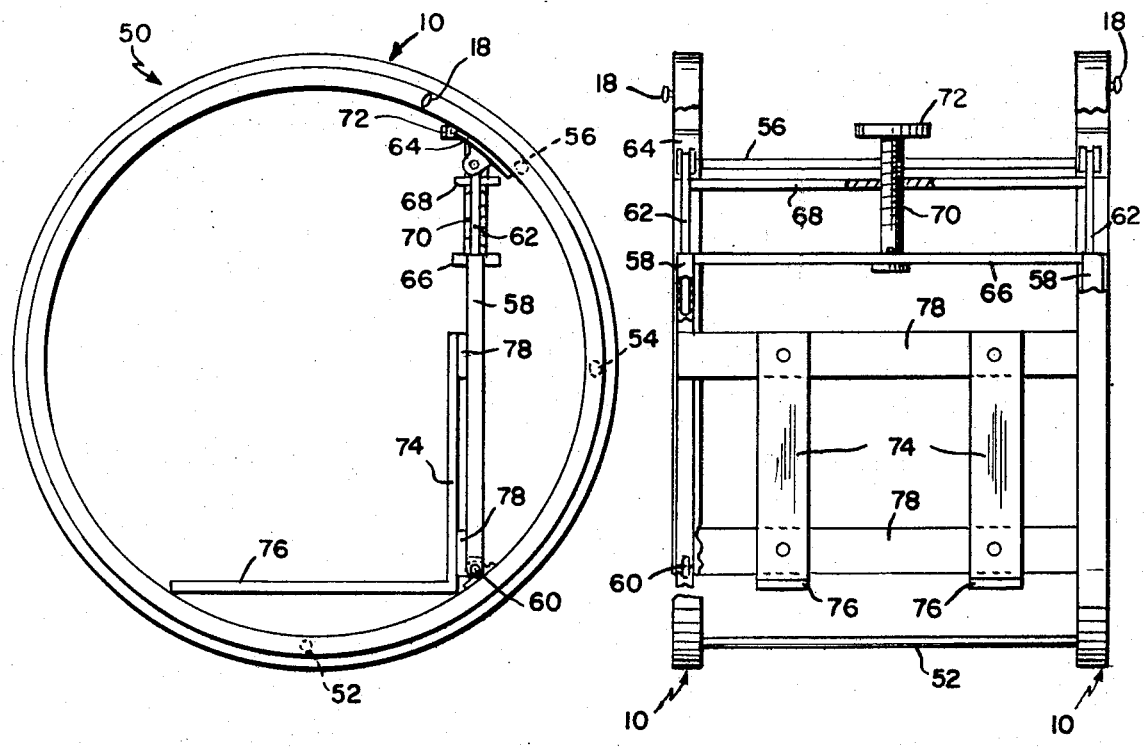
FIG. 8 is an elevation of another embodiment of the invention.
FIG. 9 is an end view of FIG. 8.

In FIGS. 8 and 9 there is shown a form of the invention comprising a fork means which enables the hand truck to pick up pallet supported loads and perform other functions of a fork-type hand truck with the advantages of the hoop design in accordance with the invention. The hand truck 50 comprises a pair of hoop means 10 as shown in FIG. 1 secured together in spaced relation by crossbars 52, 54 and 56 connected at their ends to the inner rims of the pair of hoop means 10. The hoop means 10 are also provided with set screws 18 for interconnecting the outer wheel and inner rim thereof.

Mounted in the hoop means 10 is an adjustable frame which comprises a pair of telescoping rods each of which includes an outer member 58 pivotally mounted on the inner rim of an associated hoop means at a pivot 60 and an inner member 62 mounted for sliding movement within member 58. Pivotally mounted on the extended ends of each inner member 62 is a shoe 64 adapted to frictionally engage the inner rim of the associated hoop means 10 as is best shown in FIG. 8.

Means are provided for adjusting the length of the telescoping members. To this end, there is provided a crossmember 66 connected to and extending between the outer member 58 and a cross member 68 connected to an extending between the inner members 62. A threaded bar 70 is threadedly engaged in crossmember 68 and is freely rotatably mounted at its end in crossmember 66. A handle 72 is provided on the end of bar 70 so that the bar can be rotated easily by hand. It will be apparent that rotation of bar 70 will cause movement of crossmember 68 along the bar 70 and toward or away from crossmember 66 depending on the direction of rotation. This movement causes the inner members 62 secured to crossmember 68 to move telescopically within outer members 58 to, in effect, vary the length of the telescoping members. In this manner the framework including the telescoping members can be positioned to various angles extending from the pivots 60.

The hand truck 50 is provided with a fork means for engaging a pallet load or other loads, such means comprising a pair of fork members consisting of a mounting leg 74 and a fork leg 76 extending perpendicularly from leg 74 for engaging a load. The mounting leg 74 is secured, as by mounting screws, to a pair of cross members 78 which are welded at their ends to the outer members 58 of the telescoping means.

Figure 10:
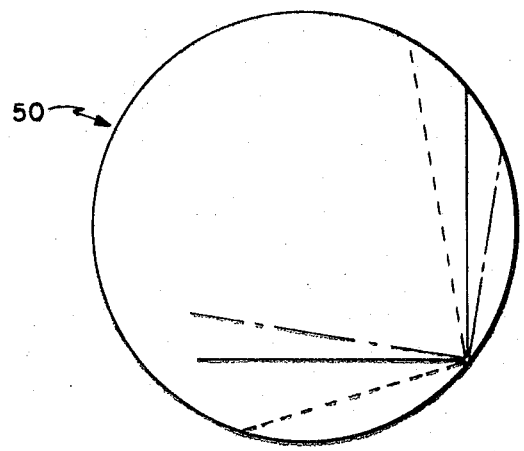
FIG. 10 is a diagrammatic illustration of the embodiment shown in FIGS. 8 and 9.

It will be apparent that the hand truck 50 may be used to perform the various functions of a fork-type hand truck. Moreover, the hand truck 50 has all the advantages of the hoop-like construction in accordance with the invention. In use, the hand truck 50 will be advanced in hoop-like fashion to position the fork members 76 within the pallet to be picked up. If the forks 76 do not fit properly, the length of the telescoping means is adjusted to position the fork members 76 at the angle which will produce a proper fit. The adjustment is such that the fork members will fit snugly under the load. The manner in which the adjustment of the angle of the telescoping members will change the position of the fork is shown in FIG. 10. This schematic showing illustrates that by pivoting the framework supporting the fork to various positions the distance the fork members 76 are above the bottom of the hoop can be varied. After the fork members 76 have been placed snugly under the load, the inner rim and the wheel means of each of the hoop means 10 are locked together, either by hand or by use of the set screws 18, and the load is tilted backwardly until the fork members 76 take possession of the load. The locking of the inner rims and outer wheels of the hoop means 10 is then released and the load is placed in the desired attitude for transporting. After this, the load is transported to the desired location in hoop-like fashion and the load is discharged from the hoop means in essentially the reverse procedure as described above.

Figure 11:
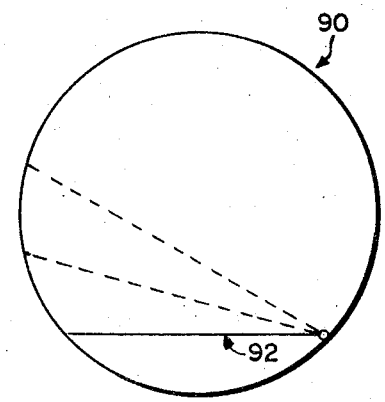
FIG. 11 is a diagrammatic illustration of another embodiment of the invention.

In FIG. 11 there is a diagrammatic showing of an alternate form of the invention in which a hoop truck 90 comprises a fork means supported on a pivoted frame 92. The position of this frame 92 is adjustable to various positions by an adjustable mechanism to place the frame 92 at various positions so that it can be spaced above the bottom of the hoop various distances. The advantage of this arrangement is that it permits adapting the hand truck 90 to suit the tailgates of various delivery trucks and permits adjusting the fork means to move into engagement with a pallet or load more effectively.

Figure 12:
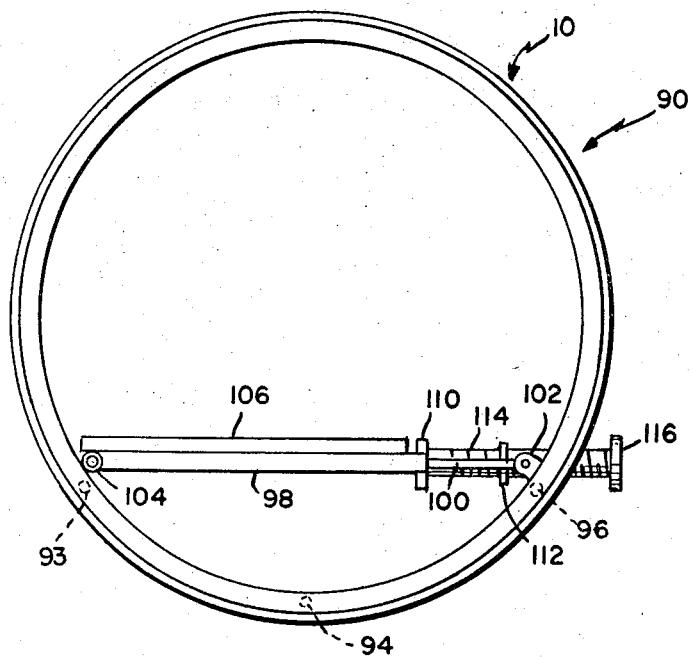
FIG. 12 is an elevation of the embodiment of FIG. 11.
Figure 13:
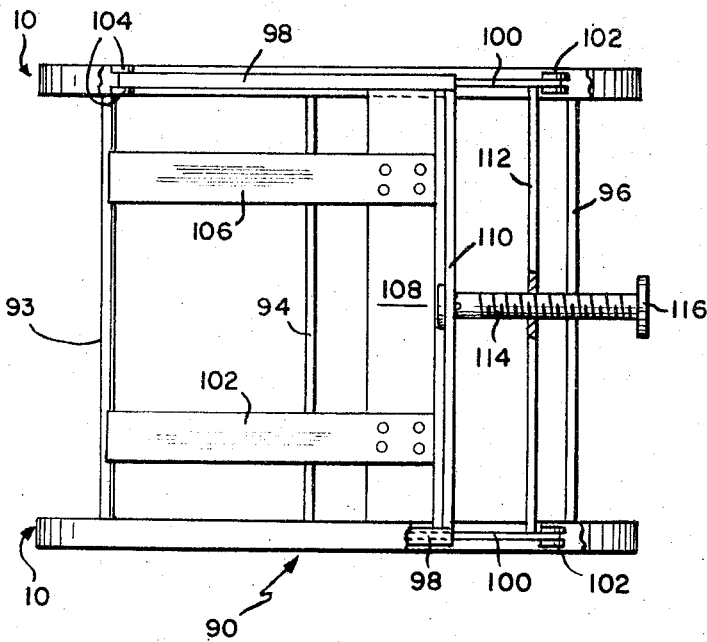
FIG. 13 is a plan view of FIG. 12.

Referring to FIGS. 12 and 13, the hand truck 90 comprises a pair of hoop means 10 secured together in spaced relation by cross bars 93, 94 and 96 connected at their ends to the inner rims of the pair of hoop means. The hoop means 10 are provided with set screws for interconnecting the outer wheel and inner rim thereof. The adjustable frame 92 is mounted in the hoop means 10 and comprises a pair of telescoping rod means each of which includes an outer member 98 and an inner member 100 mounted for sliding movement within outer member 98 and pivotally mounted on the inner rim of an associated hoop means 10 at a pivot 102. Pivotally mounted on the extended ends of each of the outer members 98 are a pair of rollers 104 adapted to engage and roll on the inner rim of the associated hoop means 10.

The hand truck 90 is provided with a fork means for engaging a pallet load or other loads, such means comprising a pair of fork members 106 which are mounted by screws to a crossmember 108 which is welded at its end to the outer members 98 of the telescoping means.

Means are provided for adjusting the length of the telescoping means of the frame 92. To this end, there is provided a crossmember of 110 connected to and extending between the outer members 98 and a crossmember 112 connected to and extending between the inner members 100. A threaded bar 114 is threadably engaged in the crossmember 112 and is freely rotatably mounted at its one end in crossmember 110. A handle 116 is provided on the other end of bar 114 so that this bar can be rotated easily by hand.

It will be apparent that rotation of the bar 114 will cause movement of crossmember 112 along the bar and toward or away from crossmember 110 depending on the direction of rotation. This movement causes the outer members 98 secured to crossmember 110 to move telescopically relative to the inner member 100 to, in effect, vary the length of the telescoping means. In this means the frame 92, including the telescoping members 98 and 100, can be positioned to various angles extending from the pivots 102 as is illustrated in FIG. 11. It will be apparent that as the length of the telescoping members is increased the rolling engagement of the rollers 104 with the inner rim of the hoop means 10 will cause the extended end of the outer members 98 to move along the inner circumference of the hoop means to accommodate the telescoping members to the length desired.

It will be evident that the fork members 106 may serve as a platform for supporting articles. Also, the fork members 106 may be replaced by a platform if desired.

It will be apparent that various changes may be made in the construction and arrangement of parts of the various embodiments of the invention without departing from the scope of the invention.

I claim:

1. A hand truck comprising an outer wheel means having a hoop-like configuration of substantial diameter and including a pair of spaced apart hoop members, an inner rim means of a hoop-like configuration mounted concentrically within said wheel means including a hoop-like rim mounted on each of said hoop members and having a circular rim portion within the interior of said wheel means, bearing means between said wheel means and said inner rim means providing for relative rotating movement therebetween whereby the truck may be moved by hand as a hoop along a surface with the wheel means rotating about the rim means, means between said spaced apart hoop members for supporting articles to be transported by said hand truck, and frame means extending between said rim members for holding the same together in spaced apart relation and to provide substantial clearance around said circumference thereof for receiving an article to be transported by relative radial-like movement through the cleared spaced-apart circumferential portions of said rim members, said frame means being located to provide a circumferential clearance of at least 180° for receiving articles between said spaced apart rim members.

2. A hand truck according to claim 1 including means for locking said wheel means and said rim means together for conjoint movement.

3. A hand truck according to claim 1 wherein said means for interconnecting said rim members comprises a platform adapted to support articles thereon and adjustable to change the center of gravity of said hand truck.

4. A hand truck according to claim 1 wherein said article support means includes fork means adapted to engage and support articles in a fork-like action.

5. A hand truck comprising an outer wheel means having a hoop-like configuration of substantial diameter and including a pair of hoop members spaced apart axially, an inner rim means of a hoop-like configuration mounted concentrically within said wheel means including a hoop-like rim mounted on each of said hoop members and having a circular rim portion on the interior of said wheel means, frame means interconnecting said rim members, bearing means between said wheel means and said inner rim means providing for relative rotating movement therebetween whereby the truck may be moved by hand as a hoop along a surface with the wheel means rotating about the rim means, fork means mounted on said interconnecting means and adapted to engage and support articles in a fork-like action, and means for pivotally mounting said fork means for adjustment to various positions.

6. A hand truck comprising an outer wheel means having a hoop-like configuration of substantial diameter and including a pair of hoop members spaced apart axially, an inner rim means of a hoop-like configuration mounted concentrically within said wheel means, including a hoop-like rim mounted on each of said hoop members and having a circular rim portion on the interior of said wheel means, frame means interconnecting said rim members, bearing means between said wheel means and said inner rim means providing for relative rotating movement therebetween whereby the truck may be moved by hand as a hoop along a surface with the wheel means rotating about the rim means, said means interconnecting said rim members comprising a platform adapted to support articles thereon, said platform being pivotally mounted on said rim means at one end and being removably mounted to said rim means at its other end for adjustment to various positions.

7. A hand truck comprising an outer wheel means having a hoop-like configuration of substantial diameter and including a pair of hoop members spaced apart axially, an inner rim means of a hoop-like configuration mounted concentrically within said wheel means including a hoop-like rim mounted on each of said hoop members and having a circular rim portion on the interior of said wheel means, frame means interconnecting said rim members, bearing means between said wheel means and said inner rim means providing for relative rotating movement therebetween whereby the truck may be moved by hand as a hoop along a surface with the wheel means rotating about the rim means, and means mounted on said inner rim members for supporting articles thereon, and means for pivotally mounting said article support means for adjustment to various positions.

8. A hand truck according to claim 7 wherein said article support means comprises a fork means and said adjusting means comprises a pair of telescoping means pivoted at one end on said inner rim means of said hoop members and carrying rolling means at the other end thereof engaging said inner rim means.

9. A hand truck according to claim 1 wherein said outer rims of said wheel means are generally rectangular in cross-section, said inner rims having radially outwardly extending wall portions adapted to receive the inner portions of said outer rims.

10. A hand truck according to claim 1 wherein said outer rims of said wheel means and said inner rims have a cross-section in the form of a U-shaped channel and being arranged to provide opposed circular wall portions, said bearing means being located between said opposed circular wall portions.

* * * * *